(12) United States Patent
Capuzza et al.

(10) Patent No.: US 7,589,957 B2
(45) Date of Patent: Sep. 15, 2009

(54) ELECTRICAL SUPPLY UNIT

(76) Inventors: Rosanno Capuzza, 17 Langdale Gardens, Waltham Cross, Hertfordshire (GB) RN8 8RD; Shemi Shemsetting Akdogan, 17 Abbotsford Road, Goodmayes, llford, Essex (GB) IG3 9SN; William Lewis Jones, 176 Dugdale Hill Lane, Potters Bar, Hertfordshire (GB) EN6 2DD ( * ) Notice: Subject to any disclaimer, the term of this patent is extended or adjusted under 35 U.S.C. 154(b) by 54 days.

(21) Appl. No.: 12/020,440

(22) Filed: Jan. 25, 2008

(65) Prior Publication Data

US 2008/0203827 A1   Aug. 28, 2008

(30) Foreign Application Priority Data

Jan. 25, 2007   (GB)   .................... 0701446.7

(51) Int. Cl.
*H02B 1/26* (2006.01)
*H02B 1/04* (2006.01)
*H02G 3/08* (2006.01)

(52) U.S. Cl. .................. 361/641; 361/643; 174/50; 174/52.1; 174/59; 174/60

(58) Field of Classification Search ........................ None
See application file for complete search history.

(56) References Cited

U.S. PATENT DOCUMENTS 5,318,356 A * 6/1994 Shelton .................... 312/223.1
5,339,956 A * 8/1994 Thomason .................. 206/372
5,932,939 A * 8/1999 Simmons .................... 307/326
6,208,507 B1 * 3/2001 Harvey .................. 361/679.55
6,227,890 B1 * 5/2001 Roper, Jr. et al. ........... 439/218
6,633,479 B2 * 10/2003 Benson ........................ 361/625
7,038,126 B2 * 5/2006 Solet ............................ 174/50
7,324,332 B1 * 1/2008 Shelton et al. .............. 361/634
7,417,850 B1 * 8/2008 Pulido .................... 361/679.01
7,513,361 B1 * 4/2009 Mills, Jr. ..................... 206/234

FOREIGN PATENT DOCUMENTS

FR   2766950   7/1997
GB   2330959   5/1999
WO   9957794   11/1999

* cited by examiner

*Primary Examiner*—Boris L Chervinsky
(74) *Attorney, Agent, or Firm*—Davis Wright Tremaine LLP; George C. Rondeau, Jr.

(57) ABSTRACT

An electrical supply unit, comprising: a sealable container having an interior and being moveable between an open position, in which the interior may be accessed by a user and a closed position, in which the interior may not be accessed by a user; and one or more charging points located in the interior of the container, each charging point being operable to provide a first supply of electricity when the container is in the closed position and operable to provide a second supply of electricity when the container is in the open position.

13 Claims, 2 Drawing Sheets

ELECTRICAL SUPPLY UNIT

BACKGROUND OF THE INVENTION

1. Field of the Invention

This invention relates to an electrical supply unit, and in particular concerns an electrical supply unit which may safely be used to charge battery powered tools in a construction or other work site environment.

2. Description of the Related Art

In many jurisdictions, for instance the United Kingdom, it is forbidden or strongly discouraged to provide power outlets at "mains" voltage on or near a building or site or other work site. Instead, power supply points supplying a significantly lower "site voltage" are generally available on site. As an example, mains voltage in the United Kingdom is 240V, but site voltage is only 110V.

The majority of powered tools used on building sites are portable and battery-powered, and the batteries of these tools need to be recharged. The charging of batteries for such tools at site voltage is generally very slow if at all possible, and it is much preferred to charge such batteries at mains voltage. Unfortunately, in the environment of a typical building site, no mains power points are available and the only such points may be located in a central contractor's office. In such sites, any mains power points are generally used almost permanently for the charging of batteries for power tools, and this is one reason why such offices are often designated as "out of bounds" to the workforce.

BRIEF SUMMARY OF THE INVENTION

It is an object of the present invention to seek to address some or all of the above problems.

Accordingly, one aspect of the present invention provides an electrical supply unit, comprising: a sealable container having an interior and being moveable between an open state, in which the interior may be accessed by a user and a closed state, in which the interior may not be accessed by a user; and one or more charging points located in the interior of the container, each charging point being operable to provide a first supply of electricity when the container is in the closed position and operable to provide a second supply of electricity when the container is in the open position.

Advantageously, the second supply of electricity is at a lower voltage than the first supply of electricity.

Preferably, the second supply of electricity is zero.

Conveniently, the electrical supply unit further comprises a detection arrangement to detect whether the container is in the open position or in the closed position.

Advantageously, the container comprises a closure which is moveable between a first configuration, in which the container is in the open position, and a second configuration, in which the container is in the closed position, and in which first and second contacts are respectively provided on the closure and on a further part of the container, the contacts coming into contact with one another when the closure is in the second configuration but not contacting one another when the closure is in the first configuration.

Preferably, the container is lockable in the closed position.

Conveniently, the first supply of electricity may only be provided when the container is in the locked position.

Advantageously, the container is of sufficient size to accommodate a power tool or battery pack thereof for each of the charging points within the interior of the container when the interior is in the closed position.

Another embodiment of the present invention provides an electrical supply unit having an input connector adapted to receive a first, lower voltage; a transformer adapted to convert the incoming supply to a second, higher voltage; and a power distribution unit, adapted to supply the second, higher voltage to one or more electrical devices.

BRIEF DESCRIPTION OF THE SEVERAL VIEWS OF THE DRAWING(S)

In order that the present invention may be more readily understood, embodiments thereof will now be described, by way of example, with reference to the accompanying drawings, in which FIG. 1 shows a cut-away view of an electrical supply unit embodying the present invention in the open position;

DETAILED DESCRIPTION OF THE INVENTION

Figure 1:
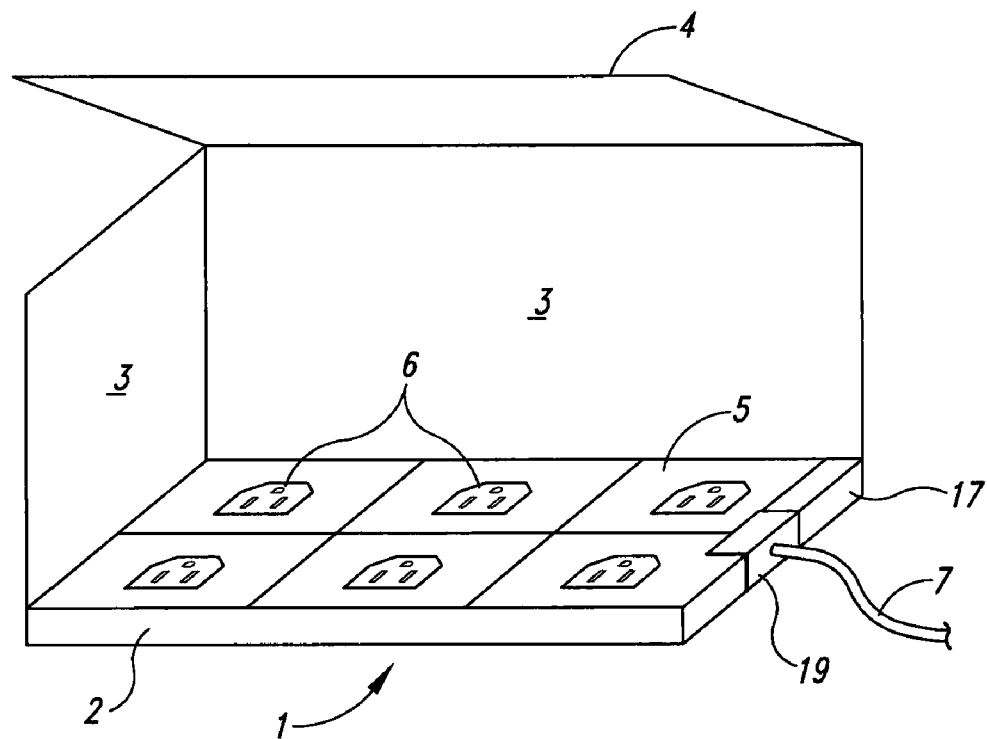

Referring to FIG. 1, an electrical supply unit 1 embodying the present invention is shown in an open state or position. The supply unit 1 comprises a container having a base 2, four side walls 3 (only two of which are shown in FIG. 1) and a lid 4, which is hingedly attached to an upper edge of one of the side walls 3. The side walls 3 present an upper opening which may be entirely sealed by the lid 4 so that the interior of the unit 1 may be completely isolated from the surroundings thereof.

Provided on an upper face 5 of the base 2 of the unit 1 are a plurality of charging or power points 6, each comprising an electrical power point adapted to receive and cooperate with a standard plug. The invention is not limited to any particular type or configuration of charging point, and it is understood that different types of plug and/or electrical connection may be used in different circumstances. A power cable 7 provides power to the unit 1, preferably from a mains source. In the example of current UK building regulations, power supplied to the unit 1 through the cable 7 will be at 110V (site voltage).

Figure 2:
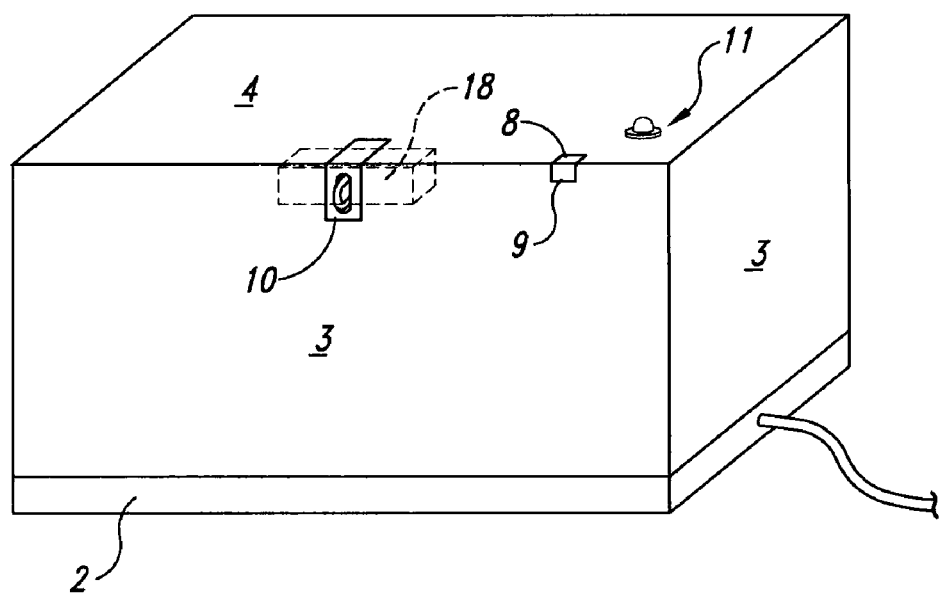
FIG. 2 shows the electrical supply unit of FIG. 1 in the closed position.

Referring to FIG. 2, the unit 1 is shown in a closed state or position, in which the lid 4 has been closed to seal the interior of the unit 1 from its surroundings.

First and second electrical contacts 8,9 are respectively provided on the lid 4 and on an upper edge of one of the side walls 3, respectively, arranged so that, when the lid 4 is in the closed position, the contacts 8 and 9 touch one another and complete a circuit, thus indicating that the lid 4 is in the closed position. In preferred embodiments of the invention, several sets of contacts may be provided at various locations around the perimeter of the lid 4, to increase the reliability of the unit 1 in determining whether the lid 4 is in the closed or open position.

Any alternative method of detecting the position of the lid 4 may be used, for instance pressure switches, inductance coils or optical sensors may be used.

In preferred embodiments, a lock 10 may be provided to place the container in a locked position. A sensor 18 may also be provided to sense whether the container is locked. An example of the sensor 18 is shown inside the unit 1 in FIG. 2; of course, it will be appreciated that the sensor 18 can be located in various different positions and may be attached to the lid 4, a wall 3, and/or the base 2.

In use of the unit 1, the lid 4 may be opened and a number of rechargeable power tools or battery packs for power tools may be connected to the power points 6, with the tools themselves being placed inside the container. When the lid 4 is in the open position, however, no electricity is supplied to the power points 6, and thus at this stage the building regulations which prohibit the supply of mains voltage on site are not violated.

However, when it is determined that the lid 4 is placed in the closed position, mains voltage may be supplied to the power points 6, thus allowing the power tools or batteries to be charged effectively. Preferably, mains voltage may only be supplied to the power points 6 if it is determined that the unit 1 is locked.

As discussed above, the power supply to the unit 1 may be at site voltage, which in the United Kingdom may be 110V. However, one or more transformers 19 are provided in the base 2 of the unit 1, which allow conversion of this input site voltage into mains voltage to be supplied to the power points 6.

If a user opens the lid 4 of the unit 1, the supply of mains voltage to the power points 6 is immediately ceased. This may be achieved by, for example, the use of a relay or other control device 17 which switches off (or otherwise controls) the supply of mains voltage to the power points 6 when the detected position of the lid 4 indicates that the lid 4 is open. The relay or other sensing device 17 may also detect signals from the sensor 18 and use this information to switch off or otherwise control the supply of mains voltage to the power points 6.

If a lock 10 is provided on the unit 1, then mains voltage may only be provided to the power points 6 if the unit 1 is in the locked position. In advantageous embodiments, a light 11 or other indicator may be provided to show that a mains voltage is being provided to the power points 6, and hence that power tools or batteries connected to the power points 6 will be charging.

It is envisaged that, when the lid 4 is in the open position, site voltage may be supplied through the power points 6. Thus, when the lid 4 is open the power points 6 of the units 1 may simply be used as normal on-site power supply points, increasing the utility of the unit 1.

While the variations in electricity supply discussed above when the container is opened and closed focus on the voltage of the supply, the invention is not limited to this and other parameters, for instance the power or current of the electricity supply, may be varied (e.g., through the use of the relay or control device 17).

It will be appreciated that embodiments of the present invention provide an electrical supply unit which will find utility in many building site or other work site environments, and which may safely allow the charging of power tools and/or battery packs therefor while remaining within prevailing building regulations.

Figure 3:
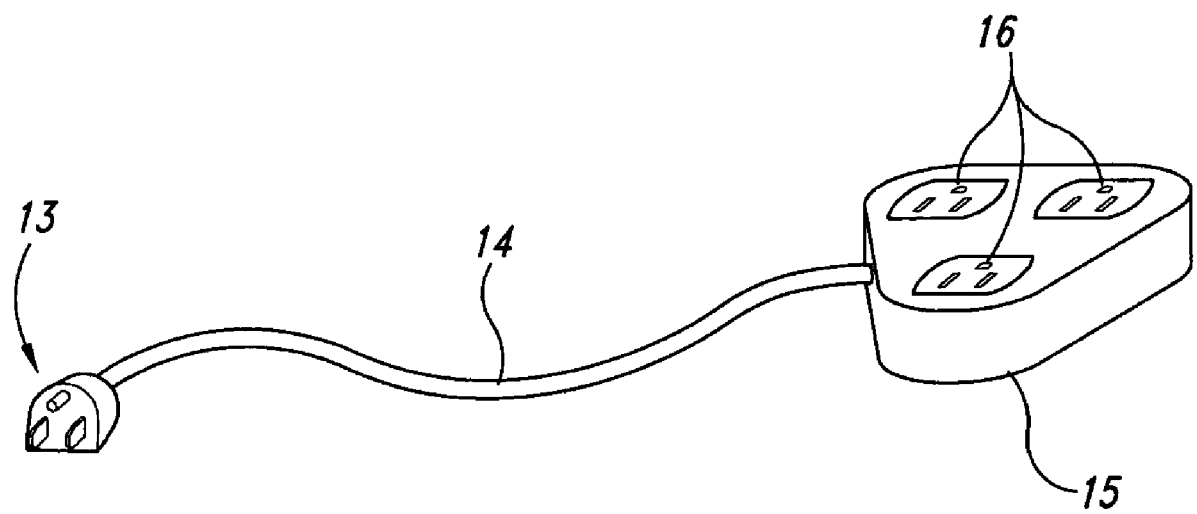
FIG. 3 shows an alternative electrical supply unit embodying the present invention.

A further embodiment of the present invention is shown in FIG. 3. An electrical connector 12 comprises a plug 13 or other input connector, which is adapted to be connected to an on-site low-voltage supply. A cable 14 connects the plug 13 to a power distribution unit 15, which includes a transformer (not shown) to convert the input voltage to a higher voltage. In preferred embodiments of the invention, the plug 13 is adapted to be connected to a 110 volt "site" voltage, and the transformer is adapted to convert this incoming supply to distribute a "mains" supply at 240 volts.

One or more power outlets 16 are provided on a face of the power distribution unit 15.

In further embodiments, the cable 14 comprises a retractable extension cable, having a variable length, with any excess cable being retained inside the plug 13 or the power distribution unit 15. This will increase the utility of the connector 12, whilst ensuring that stray lengths of cable are kept to a minimum. Advantageously, the connector 12 is provided with one or more circuit breakers (not shown) to protect against potentially damaging overloads.

It would be appreciated that the alternative electrical connector will allow power tools to be charged, and low-power tools to be operated, on-site using the available power supply.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An electrical supply unit, comprising:
   a sealable container having an interior and being moveable between an open position, in which the interior may be accessed by a user and a closed position, in which the interior may not be accessed by a user; and
   one or more charging points located in the interior of the container, each charging point being operable to provide a first supply of electricity when the container is in the closed position and operable to provide a second supply of electricity when the container is in the open position.

2. An electrical supply unit according to claim 1, wherein the second supply of electricity is at a lower voltage than the first supply of electricity.

3. An electrical supply unit according to claim 2, wherein the second supply of electricity is zero.

4. An electrical supply unit according to claim 1, further comprising a detection arrangement to detect whether the container is in the open position or in the closed position.

5. An electrical supply unit according to claim 1, wherein the container comprises a closure which is moveable between a first configuration, in which the container is in the open position, and a second configuration, in which the container is in the closed position, and in which first and second contacts are respectively provided on the closure and on a further part of the container, the contacts coming into contact with one another when the closure is in the second configuration but not contacting one another when the closure is in the first configuration.

6. An electrical supply unit according to claim 1, wherein the container is lockable in the closed position.

7. An electrical supply unit according to claim 6, wherein the first supply of electricity is provided only when the container is locked in the closed position.

8. An electrical supply unit according to claim 1, wherein the container is of sufficient size to accommodate a power tool or battery pack thereof for each of the charging points within the interior of the container when the container is in the closed position.

9. An electrical supply unit, comprising:
   a sealable container having an interior and being moveable between an open position, in which the interior may be accessed by a user and a closed position, in which the interior may not be accessed by a user;
   one or more charging points located in the interior of the container, each charging point being operable to provide a first supply of electricity when the container is in the closed position and operable to provide a second supply of electricity when the container is in the open position, the second supply of electricity being at a lower voltage than the first supply of electricity; and a detection arrangement configured to detect whether the container is in the open position or in the closed position.

10. An electrical supply unit according to claim 9, wherein the container comprises a closure which is moveable between a first configuration, in which the container is in the open position, and a second configuration, in which the container is in the closed position, and in which first and second contacts are respectively provided on the closure and on a further part of the container, the contacts coming into contact with one another when the closure is in the second configuration but not contacting one another when the closure is in the first configuration.

11. An electrical supply unit according to claim 9, wherein the first supply of electricity is provided only when the container is locked in the closed position.

12. An electrical supply unit according to claim 9, wherein the container is of sufficient size to accommodate a power tool or battery pack thereof for each of the charging points within the interior of the container when the container is in the closed position.

13. An electrical supply unit according to claim 9, further comprising:

an input connector adapted to receive a supplied first voltage;

a transformer adapted to convert the supplied first voltage to a second voltage higher than the first voltage; and a power distribution unit including the one or more charging points and adapted to supply the higher second voltage as the first supply of electricity, whereby the higher second voltage is supplied to one or more electrical devices.

* * * * *